United States Patent
Keller (10) Patent No.: US 10,498,204 B2
(45) Date of Patent: Dec. 3, 2019

(54) METHODS OF ASSEMBLING AN ELECTRICAL MACHINE

(71) Applicant: ALSTOM RENEWABLE TECHNOLOGIES WIND B.V., Ridderkerk (NL)

(72) Inventor: Stefan Keller, Barcelona (ES)

(73) Assignee: GE RENEWABLE TECHNOLOGIES WIND B.V., Breda (NL)

(*) Notice: Subject to any disclaimer, the term of this patent is extended or adjusted under 35 U.S.C. 154(b) by 355 days.

(21) Appl. No.: 14/971,741

(22) Filed: Dec. 16, 2015

(65) Prior Publication Data

US 2016/0190901 A1    Jun. 30, 2016

(30) Foreign Application Priority Data

Dec. 24, 2014   (EP) .................................. 14382570

(51) Int. Cl.
*H02K 15/16* (2006.01)
*H02K 1/27* (2006.01)
(Continued)

(52) U.S. Cl.
CPC ............. *H02K 15/16* (2013.01); *H02K 1/274* (2013.01); *H02K 1/2786* (2013.01); *H02K 3/46* (2013.01);
(Continued)

(58) Field of Classification Search
CPC ........ H02K 1/278; H02K 3/46; H02K 15/028; H02K 15/03; H02K 15/06; H02K 15/16;
(Continued)

(56) References Cited

U.S. PATENT DOCUMENTS 3,603,824 A  *  9/1971  Csaki ..................... H02K 15/16
                                                        310/239
6,487,769 B2   12/2002  Ketterer et al.
(Continued)

FOREIGN PATENT DOCUMENTS

DE      102005042543    *  3/2007
EP      2 381 561 A2      10/2011
(Continued)

OTHER PUBLICATIONS

EP Search Report, dated Jun. 15, 2015.
Office Action issued in connection with corresponding EP Application No. 14382570.1 dated Jan. 2, 2019.

*Primary Examiner* — A. Dexter Tugbang
(74) *Attorney, Agent, or Firm* — Dority & Manning, P.A.

(57) ABSTRACT

A method of constructing an electrical machine by assembling a first structure (one of a rotor and stator structure) and a second structure (the other of the rotor and stator structure), along with a plurality of first elements (one of a plurality of permanent magnet elements and a plurality of winding elements) and a plurality of second elements (the other plurality of the permanent magnet elements and winding elements). The first elements are attached to a rim of the first structure, and the second elements are attached to the first elements, this attachment being caused by a magnetic attraction. The first structure is assembled with the second structure such that the second elements are positioned for a posterior attachment to a rim of the second structure, and the second elements are attached to the rim of the second structure.

20 Claims, 8 Drawing Sheets

(51) Int. Cl.
*H02K 3/46* (2006.01)
*H02K 15/03* (2006.01)
*H02K 15/06* (2006.01)
*H02K 15/02* (2006.01)
*H02K 35/02* (2006.01)
*H02K 21/22* (2006.01)
*H02K 21/12* (2006.01)

(52) U.S. Cl.
CPC ........... *H02K 15/028* (2013.01); *H02K 15/03* (2013.01); *H02K 15/06* (2013.01); *H02K 1/278* (2013.01); *H02K 21/12* (2013.01); *H02K 21/22* (2013.01); *H02K 21/227* (2013.01); *H02K 35/02* (2013.01); *H02K 2213/12* (2013.01); *Y02E 10/725* (2013.01); *Y10T 29/49009* (2015.01); *Y10T 29/49012* (2015.01); *Y10T 29/49069* (2015.01); *Y10T 29/49073* (2015.01)

(58) Field of Classification Search
CPC .. H02K 2213/12; H02K 1/274; H02K 1/2786; H02K 21/21; H02K 21/22; H02K 21/227; H02K 35/02; H02K 21/12; Y10T 29/49009; Y10T 29/49012; Y10T 29/49069; Y10T 29/49073; Y02E 10/725
See application file for complete search history.

(56) References Cited

U.S. PATENT DOCUMENTS

| | | |
|---|---|---|
| 2008/0309189 A1 | 12/2008 | Pabst et al. |
| 2010/0011567 A1* | 1/2010 | Helle ............. H02K 15/03 29/598 |
| 2010/0301712 A1* | 12/2010 | Amutham ........ H02K 21/22 310/68 B |
| 2011/0298325 A1* | 12/2011 | Rombach ......... H02K 15/03 310/156.16 |
| 2012/0091719 A1* | 4/2012 | Guruswamy ....... H02K 35/02 290/55 |
| 2012/0112466 A1* | 5/2012 | Junge ............. H02K 1/2786 290/55 |
| 2013/0049511 A1* | 2/2013 | Nishimura ........ H02K 1/278 310/156.28 |
| 2014/0028138 A1 | 1/2014 | Feher et al. |

FOREIGN PATENT DOCUMENTS

| | | | |
|---|---|---|---|
| EP | 2 508 749 A1 | | 10/2012 |
| EP | 2536007 | * | 12/2012 |
| JP | 2006304556 A | * | 11/2006 |
| JP | 2007028725 A | * | 2/2007 |

* cited by examiner

METHODS OF ASSEMBLING AN ELECTRICAL MACHINE

The present disclosure relates to methods for assembling electrical machines. This application claims priority to European Application No. 14382570.1, filed Dec. 24, 2014, the entire contents of which are hereby incorporated by reference.

BACKGROUND ART

Electrical machines generally comprise a rotor structure and a stator structure. In case of permanent magnet excited generators (PMG) permanent magnets (PM) are generally comprised in the rotor (although they could also be arranged alternatively in the stator structure), whereas winding elements (e.g. coils) are usually included in the stator (although they could alternatively be arranged in the rotor structure).

The insertion of a rotor of a PM generator carrying already magnetized magnet elements into a pre-assembled stator, i.e. a stator structure plus winding elements and stator core can be complicated due to the high attraction forces generated by the magnets between the stator core and the magnets (i.e. between stator and rotor). These magnetic forces pull the rotor towards the stator and lead to an inherently unstable situation with respect to the radial centering, i.e. a small eccentricity of the rotor may lead to high magnetic forces trying to increase the eccentricity. As a result, not only expensive and voluminous tooling is generally required for this operation, but the operation can also entail a significant health and safety risk.

In alternative methods, in order to reduce these attraction forces, it has been proposed to first assemble a rotor structure without magnets with a stator structure carrying windings. Because no magnetic elements are provided, this assembly can be relatively easy.

Then, subsequently, permanent magnet modules can be mounted onto the rotor structure. Such permanent magnet modules may advantageously be slid into a slot provided on a rotor rim.

A permanent magnet module may be defined as a unit having a plurality of permanent magnets, such that the plurality of magnets can be mounted and unmounted together. Such a module may have a module base with a shape suitable for housing a plurality of permanent magnets. The magnets may be fixed to the base in a variety of manners. The base may be configured to be fixed to a rotor rim in such a way that the plurality of magnets are fixed together to the rotor rim through the module base. The use of permanent magnet modules can facilitate the manufacturing of a generator rotor.

Even though this method of assembly may generally be easier than the previous one, also in this method the magnetic attraction when inserting the permanent magnet modules may cause problems and more so when a number of modules have already been mounted. Again heavy and costly guiding systems and tools are generally required. Furthermore, the operation may be time consuming due to the high number of modules to be inserted.

The present disclosure aims at improving the prior art methods of assembling an electrical machine such as e.g. a PMG.

SUMMARY

In a first aspect, a method is provided of constructing an electrical machine by assembling a first structure and a second structure along with a plurality of first elements and a plurality of second elements.

The first structure is one of a rotor structure and a stator structure. The second structure is the other of the rotor structure and the stator structure. The plurality of first elements is one of a plurality of permanent magnet elements and a plurality of winding elements.

The plurality of second elements is the other of the plurality of permanent magnet elements and the plurality of winding elements.

Each of the winding elements can generally comprise a rotor/stator core with one or more coils or with stator bars.

The method comprises attaching the first elements to a rim of the first structure. The method further comprises attaching the second elements to the first elements. This attachment is caused by a magnetic attraction due to a magnetic field generated by the permanent magnet elements, such that no extra material (e.g. screws, bolts, adhesives, etc.) is required.

The attachment of the second elements to the first elements can be performed under diverse ratios between first and second elements. Hence, this attachment is not limited to a one-to-one relationship (i.e., one second element to one first element), but other cardinality relations are possible such as e.g. 9 to 8 or vice versa.

The method still further comprises assembling the first structure with the second structure such that the second elements are positioned for their posterior attachment to a rim of the second structure, and attaching the second elements to the rim of the second structure, such that the second elements are moved away from the first elements.

A rim of a rotor/stator structure can be defined as a surface of the rotor/stator structure to which permanent magnet/winding elements can be attached to form an electrical machine.

Therefore, in some examples, the method may comprise attaching the permanent magnet elements to a rim of the rotor structure, and attaching the winding elements to the permanent magnet elements. This attachment is caused by magnetic attraction due to a magnetic field generated by the permanent magnet elements. The method may further comprise assembling the rotor structure with the stator structure such that the winding elements are positioned for their posterior attachment to a rim of the stator structure. The method may still further comprise attaching the winding elements to the rim of the stator structure, such that the winding elements are moved away from the permanent magnet elements.

According to other examples, the method may comprise attaching the winding elements to a rim of the rotor structure, and attaching the permanent magnet elements to the winding elements. This attachment is caused by magnetic attraction due to a magnetic field generated by the permanent magnet elements. The method may further comprise assembling the rotor structure with the stator structure such that the permanent magnet elements are positioned for their posterior attachment to a rim of the stator structure. The method may still further comprise attaching the permanent magnet elements to the rim of the stator structure, such that the permanent magnet elements are moved away from the winding elements.

In other examples, the method may comprise attaching the permanent magnet elements to a rim of the stator structure, and attaching the winding elements to the permanent magnet elements. This attachment is caused by magnetic attraction due to a magnetic field generated by the permanent magnet elements. The method may further comprise assembling the stator structure with the rotor structure such that the winding elements are positioned for their posterior attachment to a rim of the rotor structure. The method may still further comprise attaching the winding elements to the rim of the rotor structure, such that the winding elements are moved away from the permanent magnet elements.

In further examples, the method may comprise attaching the winding elements to a rim of the stator structure, and attaching the permanent magnet elements to the winding elements. This attachment is caused by magnetic attraction due to a magnetic field generated by the permanent magnet elements. The method may further comprise assembling the stator structure with the rotor structure such that the permanent magnet elements are positioned for their posterior attachment to a rim of the rotor structure. The method may still further comprise attaching the permanent magnet elements to the rim of the rotor structure, such that the permanent magnet elements are moved away from the winding elements.

As explained before, the permanent magnet elements generate a magnetic field that can generate attraction forces and can complicate the assembly of an electrical machine in prior art assembling methods. An aspect of the proposed method of constructing an electrical machine is that situations in which problems may occur due to these attraction forces can be avoided. Instead of facing such problematic situations (occurring in prior art methods), advantage is taken of the attraction forces for temporarily attaching the winding elements to the permanent magnet elements or vice versa.

Once the first structure with attached permanent magnet elements and winding elements has been obtained, the magnetic flux is guided within the winding elements and permanent magnets, so that the assembly of said first structure with a compatible second structure can be relatively easily done in the absence of magnetic attraction forces between these components.

In some examples, attaching the second elements to the first elements may comprise attaching the second elements to the first elements with one or more first non-magnetic separators sandwiched between the first elements and the second elements. These one or more first non-magnetic separators can provide a protection for the permanent magnet elements and winding elements, such that damages between said elements can be attenuated or avoided during construction of the electrical machine.

According to some examples, attaching the second elements to the rim of the second structure may cause the release of the first non-magnetic separators, and the method may further comprise removing the released first non-magnetic separators. In these examples, a "clean" air-gap (without extra elements) between the permanent magnet elements and the winding elements will result in the electrical machine.

In alternative examples, the one or more first non-magnetic separators can be attached to the first or second elements (through e.g. screws, glue, etc.) so that release of the first non-magnetic separators will not result from attaching the second elements to the rim of the second structure. Hence, in these alternative examples, the first non-magnetic separators will remain in the electrical machine, such that they can act as a protection layer between permanent magnet elements and winding elements during operation of the electrical machine.

In some examples, a shape of a rotor side surface of the first non-magnetic separators may be adapted to mate with the shape of a perimeter of the rotor. For example the first non-magnetic separators may comprise protrusions (or male parts) mating with depressions (or female parts) of the permanent magnet elements or winding elements at the rotor side. This may permit having a guided interface between the permanent magnet elements or winding elements (at the rotor side) and the first non-magnetic separators such that their coupling can be facilitated.

In some examples, a shape of a stator side surface of the first non-magnetic separators may be adapted to mate with the shape of a perimeter of the stator. For example, the first non-magnetic separators may comprise protrusions (or male parts) mating with depressions (or female parts) of the winding elements or permanent magnet elements at the stator side. This way, a guided interface between the winding elements or permanent magnet elements (at the stator side) and the first non-magnetic separators may be provided that facilitates the coupling between the winding elements or permanent magnet elements (at the stator side) and the first non-magnetic separators.

The previously described guided interfaces may facilitate the correct tangential positioning of the second elements with respect to the first elements.

In some examples, the one or more first non-magnetic separators may have a thickness between approximately 2 mm and approximately 4 mm smaller than a nominal air-gap value.

In some examples attaching the second elements to the first elements may comprise attaching at least one pair of the second elements to corresponding first elements with a second non-magnetic separator sandwiched between said second elements. In particular examples, the second non-magnetic separator may have a thickness in a range of approximately 0.3 mm to approximately 0.7 mm, and preferably substantially equal to 0.5 mm.

These second separators between second elements may provide another means to correctly position the second elements tangentially with respect to the first elements.

In some examples, the attachment of at least one of the second elements to corresponding first elements may be performed before the attachment of said first elements to the rim of the first structure. Some assemblies constituted by permanent magnet elements and winding elements (with or without non-magnetic separators) may therefore be assembled before the attachment of the first elements to the rim of the first structure. Then, said assemblies can be attached to the rim of the first structure by the side of the first elements. This feature may provide certain flexibility to some examples of the constructing method.

According to examples, attaching the second elements to the rim of the second structure may comprise screwing the second elements to the second structure. An aspect of screwing the second elements is that the thread(s) of the screws, bolts or similar used for that purpose may support strong forces, such as the attraction forces caused by the permanent magnet elements. Hence, screwing may permit overcoming these attraction forces and, therefore, pulling the second elements towards the second structure in a very controlled manner.

In examples, a permanent magnet element may be a single permanent magnet which may be attached directly to the rim of the first or second structure. Alternatively, a permanent magnet element may be a permanent magnet module comprising a module base and a plurality of permanent magnets coupled to the module base, such that said permanent magnets may be attached together to the rim of the first or second structure through the module base. An aspect of using permanent magnet modules is that the assembly of the rotor or stator can be further facilitated.

In some examples, a winding element may be a single tooth with one coil which may be fastened directly to the first or second structure. Alternatively, a winding element may be a coil module comprising several teeth and a plurality of coils coupled to the teeth, such that said coils may be attached together to the first or second structure through the teeth. An aspect of using coils modules is that the assembly of the rotor or stator may be further facilitated. Instead of coils, bars forming a part of a so-called distributed winding might be used in alternative examples.

The steps of the (constructing) methods described herein may be performed in any order possible. Further, some steps may be performed simultaneously despite being described or implied as occurring non-simultaneously (e.g., because one step is described after the other step).

BRIEF DESCRIPTION OF THE DRAWINGS

Non-limiting examples of the present disclosure will be described in the following, with reference to the appended drawings, in which.

DETAILED DESCRIPTION OF EXAMPLES

FIGS. 1a to 8b will be used for describing examples of methods of assembling an electrical machine such as e.g. a generator.

Figure 1A:
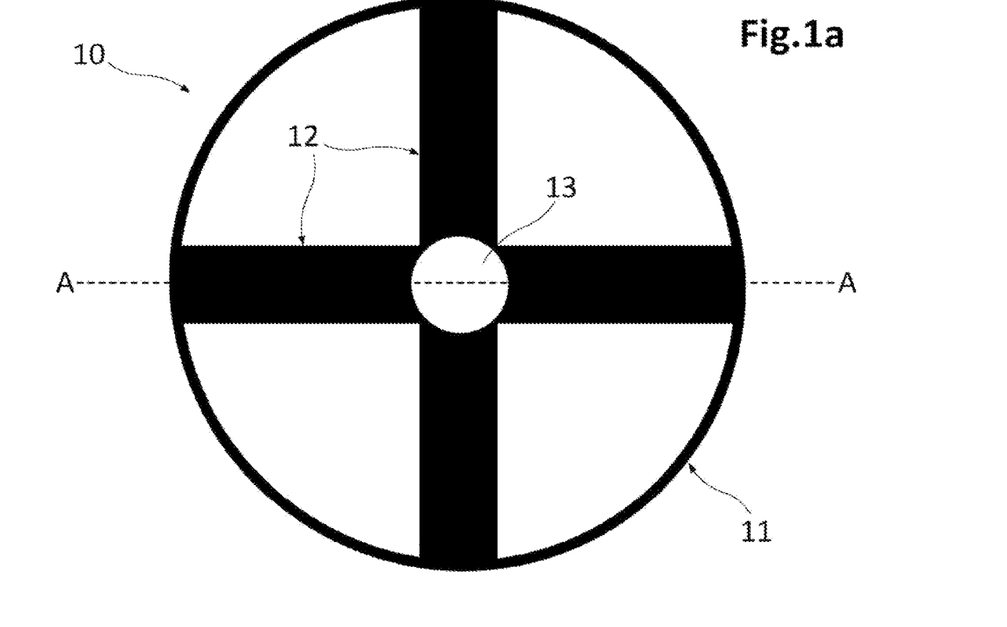
FIG. 1a illustrates a schematic, top view of one embodiment of a rotor structure mounted on a supporting structure.
Figure 1B:
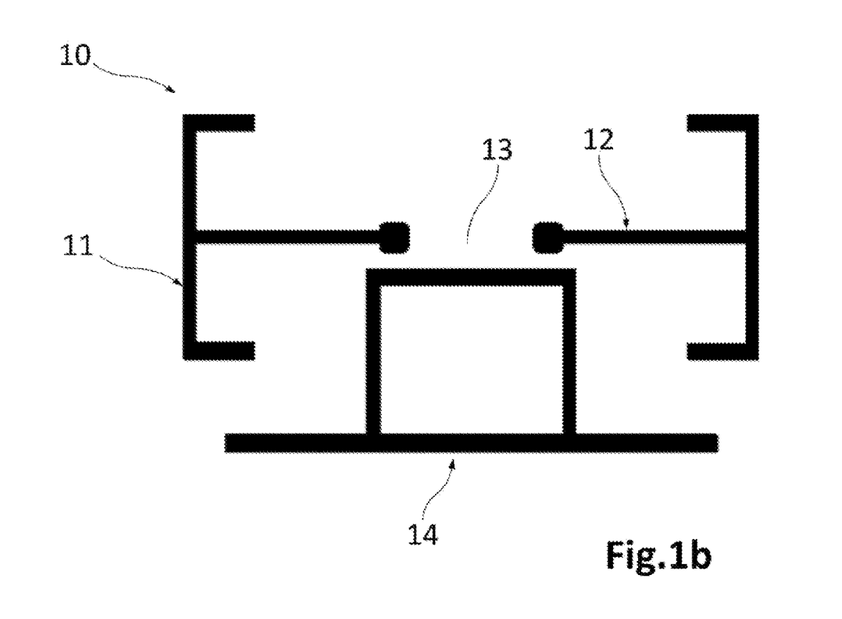
FIG. 1b illustrates a schematic, cross-sectional view of the rotor structure shown in FIG. 1a taken about plane A-A.

FIGS. 1a and 1b schematically illustrate an example of rotor structure 10 which has been mounted on a supporting structure 14 such as e.g. a pedestal. FIG. 1a shows the rotor structure 10 which in this example has a rotor rim 11, spokes 12 and a central opening 13 for its coupling with a rotor shaft or with one or more bearings (not shown) depending on the configuration chosen. FIG. 1b is a schematic representation of a cross sectional view of the rotor structure 10 mounted on the pedestal 14 according to a plane AA indicated in FIG. 1a.

Figure 2A:
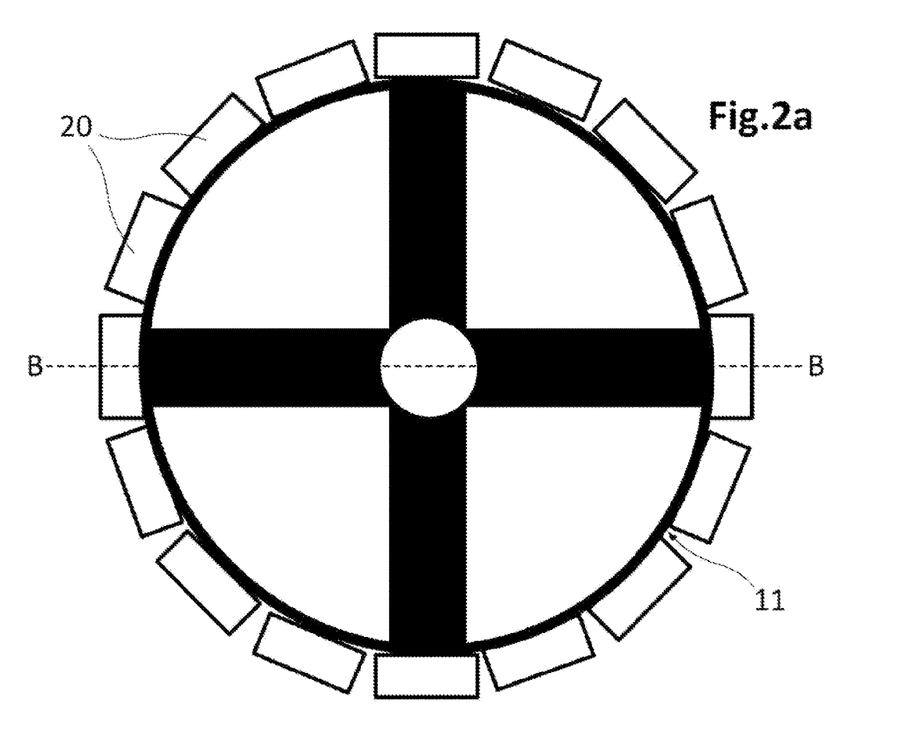
FIG. 2a illustrates a schematic, top view of the rotor structure shown in FIG. 1a, particularly illustrating permanent magnet elements.
Figure 2B:
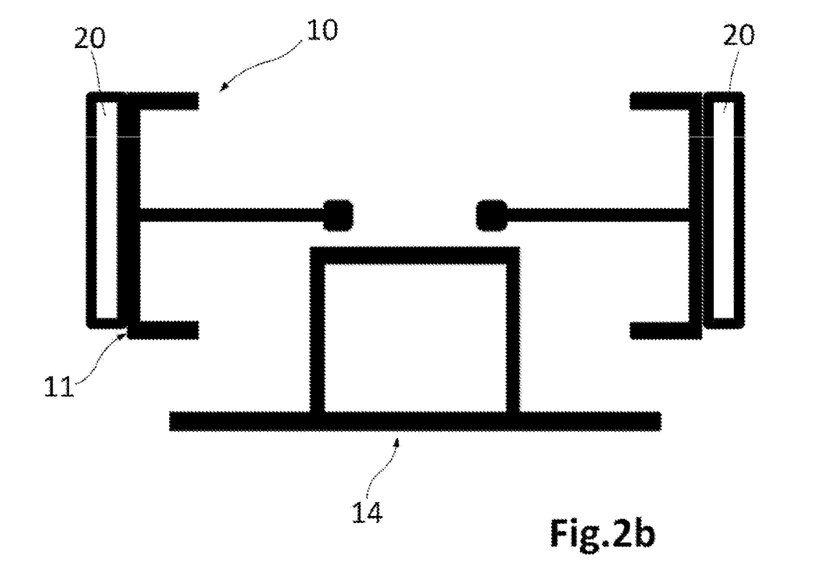
FIG. 2b illustrates a schematic, cross-sectional view of the rotor structure shown in FIG. 2a taken about plane B-B.

Once the rotor structure 10 is mounted on the pedestal 14, an arrangement as the one shown in FIGS. 2a and 2b can be obtained. This arrangement may result from attaching a plurality of permanent magnet elements 20 to the rim 11 of the rotor structure 10. FIG. 2a is a schematic illustration of a top view of the rotor structure 10 with permanent magnet elements 20. FIG. 2b schematically shows a cross sectional view of the rotor structure 10 with permanent magnet elements 20 according to a reference plane BB indicated in FIG. 2a.

In some examples, a permanent magnet element 20 may be a single permanent magnet which is attached directly to the rotor rim 11 through e.g. screws, and/or adhesives, etc. Alternatively, a permanent magnet element 20 may be a permanent magnet module which comprises a module base and a plurality of permanent magnets coupled to the module base, such that said permanent magnets are attached together to the rotor rim 11 through the module base.

Figure 3A:
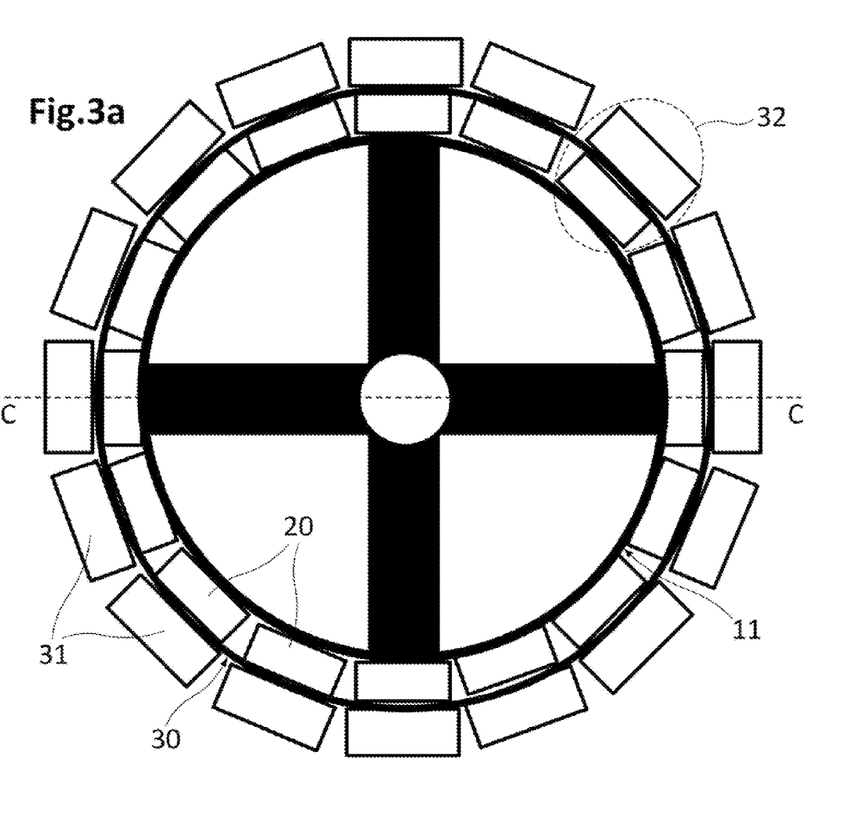
FIG. 3a illustrates a schematic, top view of the rotor structure shown in FIG. 2a, particularly illustrating first non-magnetic separators and winding elements.
Figure 3B:
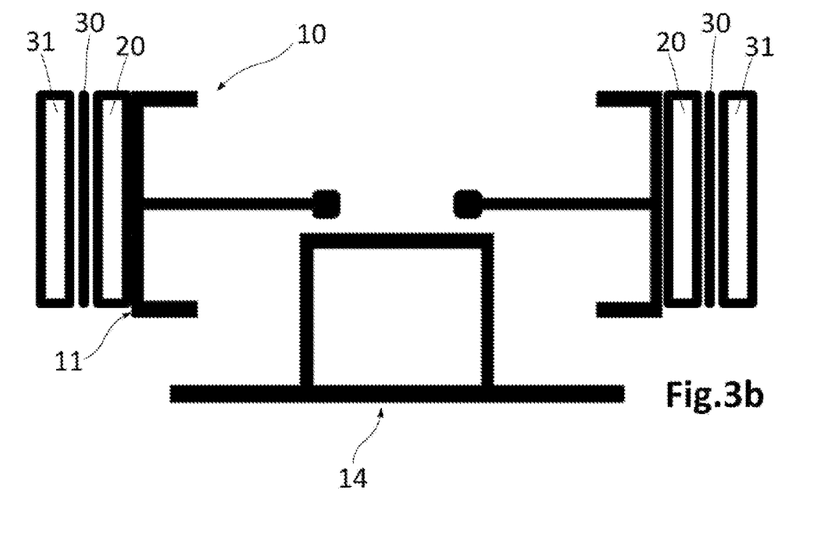
FIG. 3b illustrates a schematic, cross-sectional view of the rotor structure shown in FIG. 3a taken about plane C-C.

After having attached the permanent magnet elements 20 to the rotor rim 11, an arrangement as the one depicted in FIGS. 3a and 3b can be achieved. In particular, a plurality of winding elements 31 can be attached to the permanent magnet elements 20 with a first non-magnetic separator 30 sandwiched between the winding elements 31 and the permanent magnet elements 20. A plurality of non-magnetic segments can be suitably arranged (or coupled) in such a way that the first non-magnetic separator 30 is obtained in the form depicted in FIG. 3a. Advantage can be taken of a magnetic attraction due to a magnetic field created by the permanent magnet elements 20 for implementing this attachment, such that no extra elements (such as e.g. screws, bolts, adhesives, etc.) are required for this aim.

FIG. 3a schematically shows a top view of the arrangement of the rotor structure 10 with permanent magnet elements 20, first non-magnetic separator(s) 30 and winding elements 31. FIG. 3b is a schematic illustration of a cross sectional view of this arrangement according to a reference plane CC indicated in FIG. 3a. A region 32 comprising part of the permanent magnet element(s) 20, first non-magnetic separator(s) 30 and winding element(s) 31 is also indicated in FIG. 3a, which will be described in detail in other parts of the description.

In some examples, a winding element may be a single tooth and coil or, alternatively, a coil module which comprises several teeth and a plurality of coils coupled to these teeth. Alternatively, stator bars forming a part of a so-called distributed winding might be used instead of coils.

The thickness of the first non-magnetic separators 30 may be defined beforehand based on several design factors. The value of this thickness may depend on a specified air-gap 80 (see FIG. 8b) between the rotor and the stator active parts once the assembly of the machine is terminated. Furthermore, this thickness may depend on the manufacturing tolerances, or on a minimum thickness required to avoid demagnetization of the permanent magnet elements 20.

Taking the above into account, the first non-magnetic separator(s) 30 may generally have a thickness in a range of approximately 3 mm to 5 mm, and preferably substantially equal to 4 mm.

In some examples, all the winding elements 31 and corresponding first separators 30 may be attached to permanent magnet elements 20 as described before, i.e. once permanent magnet elements 20 have been attached to rotor rim 11.

In alternative examples, only part of the winding elements 31 and corresponding first separators 30 may be attached to permanent magnet elements 20 once permanent magnet elements 20 have been attached to the rotor rim 11. In this case, remaining winding elements 31 and first separators 30 may be attached to other permanent magnet elements 20 before their attachment to the rotor rim 11.

Figure 4A:
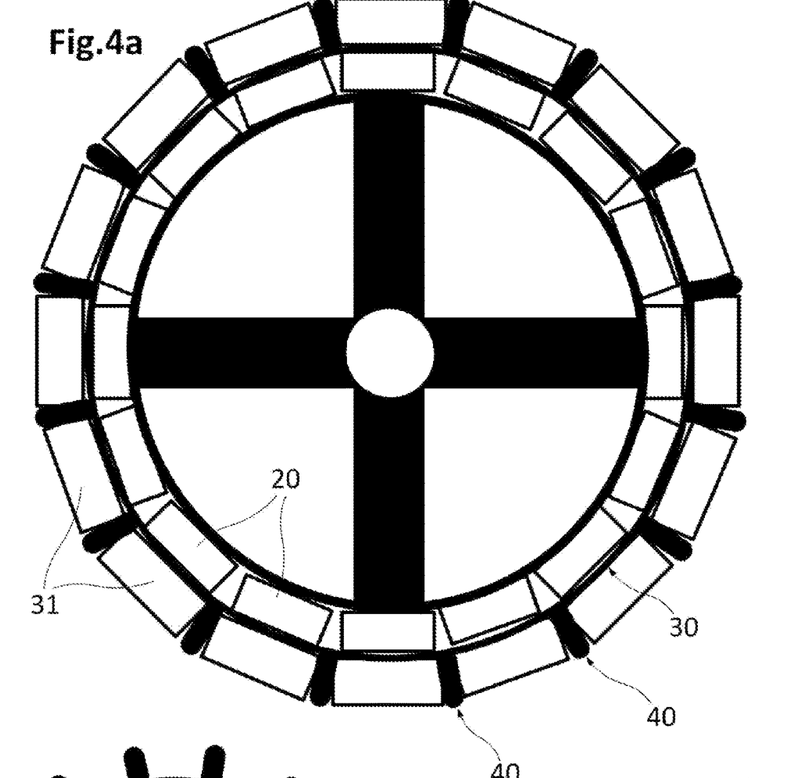
FIG. 4a illustrates a schematic, top view of the rotor structure shown in FIG. 3a, particularly illustrating second non-magnetic separators.

FIG. 4a schematically shows that second non-magnetic separators 40 may be arranged between winding elements 31 in order to ensure that a desired distance between winding elements 31 is kept. The attraction force due to the magnetic field generated by the permanent magnet elements 20 can force the winding elements 31 to be displaced. Hence, the proposed second non-magnetic separators 40 may have the function of counteracting said forced displacement in such a way that the winding elements 31 remain at an expected position. This may further facilitate the assembling of the electrical machine.

Figure 4B:
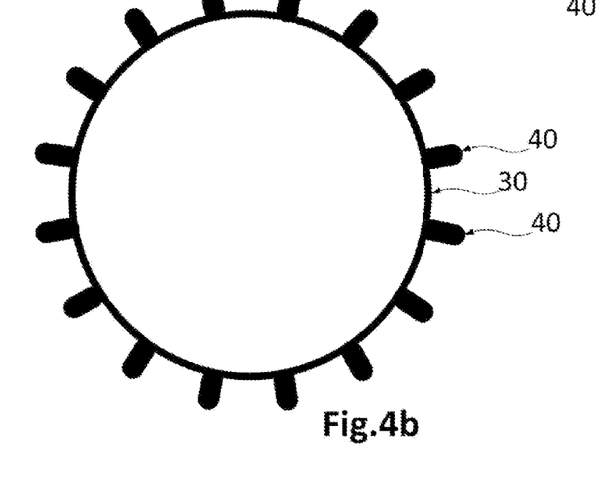
FIG. 4b illustrates a partial, schematic view of the rotor structure shown in FIG. 4a, particularly illustrating the first and second non-magnetic separators as a single piece.

Permanent magnet elements 20 and winding elements 31 may be separated by first and second non-magnetic separators 30, 40 integrally formed as a single piece similar to the one shown in FIG. 4b. This single piece may be called herein "complete separator" in the sense that all the permanent magnet elements 20 and winding elements 31 are separated by said single complete separator.

In alternative examples, a plurality of smaller separators having e.g. a first non-magnetic separator 30 and two second non-magnetic separators 40 could be used for obtaining a complete separator. These smaller separators, as the ones shown in FIGS. 4c and 4d, may be called herein "local" separators in the sense that they have the function of locally separating particular permanent magnet element(s) 20 and winding element(s) 31.

Figure 4C:
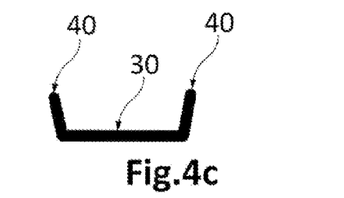
FIG. 4c illustrates a partial, schematic view of the rotor structure shown in FIG. 4a, particularly illustrating a local separator including a first separator and two second separators formed as a single piece.

FIG. 4c schematically illustrates a local separator comprising a first separator 30 (for separating a permanent magnet element 20 and a winding element 31), and two second separators 40 (for separating neighbouring winding elements 31), said first and second separators 30, 40 being integrally formed as a single piece.

Figure 4D:
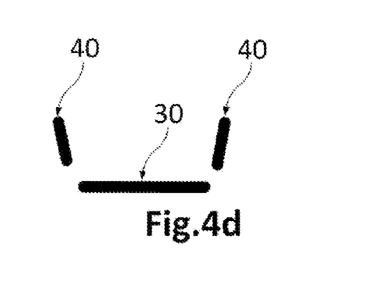
FIG. 4d illustrates a partial, schematic view of the rotor structure shown in FIG. 4a, particularly illustrating a local separator including a first separator and two second separators formed as separate pieces.

FIG. 4d schematically illustrates an alternative local separator comprising a first separator 30 and two second separators 40 which are separate pieces. A local separator similar to the one shown in FIG. 4c can be obtained by suitably coupling first and second separators 30, 40 and/or suitably placing them between corresponding permanent magnet elements 20 and winding elements 31.

Any of the first non-magnetic separators 30 and second non-magnetic separators 40 may be made of non-magnetic materials such as e.g. plastic, or aluminium, etc.

A complete separator similar to the one shown in FIG. 4b can be obtained by using a suitable number of local separators similar to the ones shown in FIGS. 4c and/or 4d.

Figure 5A:
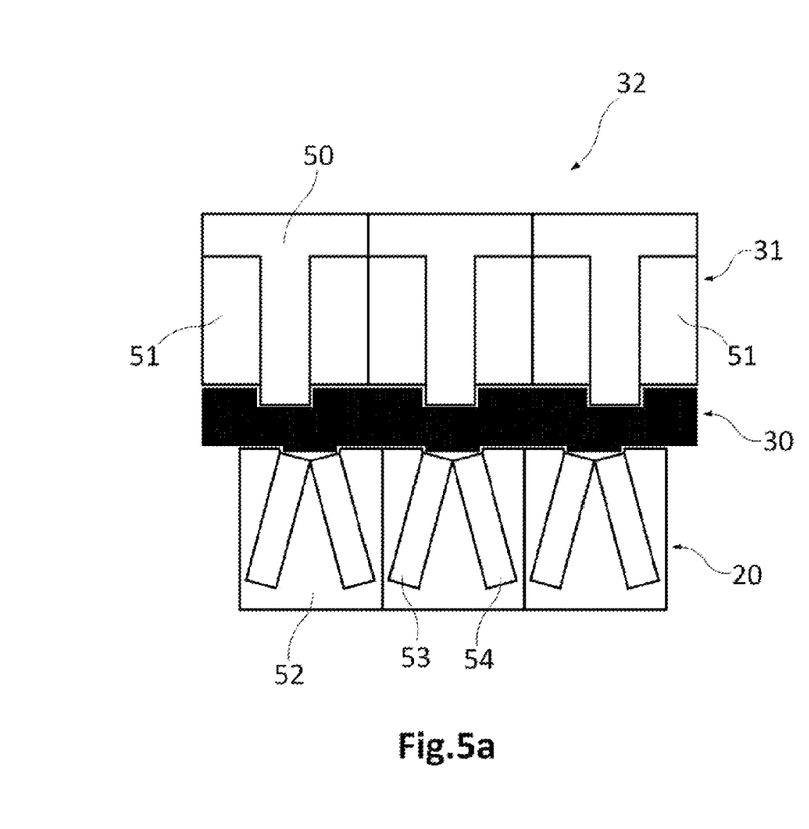
FIG. 5a illustrates a partial, perspective view of the rotor structure shown in FIG. 3a, particularly illustrating first protrusions of the first non-magnetic separator received within first depressions of the winding elements and second protrusions of the first non-magnetic separator received within second depressions of the permanent magnet elements.
Figure 5B:
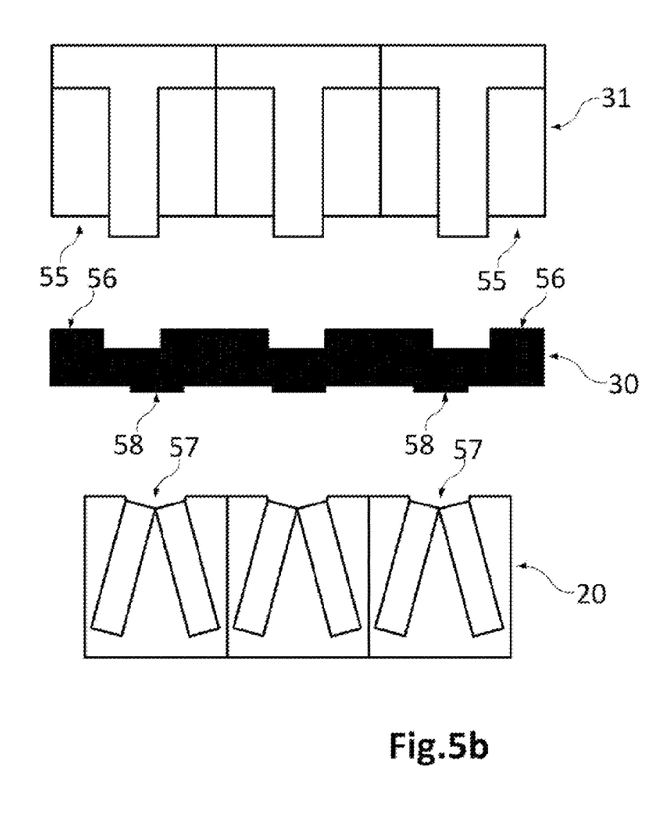
FIG. 5l illustrates a partial, perspective view of the rotor structure shown in FIG. 5a, particularly illustrating the permanent magnet elements and winding elements expanded away from the first non-magnetic separator.

A first non-magnetic separator 30 between permanent magnet element(s) 20 and winding element(s) 31 may have a form such that a guided interface between the first separator 30 and permanent magnet element(s) 20 and/or winding element(s) 31 can be obtained. FIGS. 5a and 5b show an example of this feature.

In particular, FIGS. 5a and 5b show a region 32 of an arrangement similar to the one depicted in FIG. 3a in which the first separator 30 has protrusions or male parts 56 mating with depressions or female parts 55 of the winding element(s) 31, and protrusions or male parts 58 mating with depressions or female parts 57 of the permanent magnet element(s) 20.

The winding elements (or winding modules) 31 are shown in FIGS. 5a and 5b having a tooth 50 and corresponding coils or windings 51 coupled to the tooth 50, and the permanent magnet elements (or permanent magnet modules) 20 are shown having a module base 52 and permanent magnets 53, 54 attached to the base 52.

The permanent magnet modules 20 are shown having an inverted V structure of permanent magnets 53, 54, and the depressions or female parts 57 are shown located substantially at the vertex of the inverted V of magnets 53, 54. The coils modules 31 are shown in FIGS. 5a and 5b having the depressions or female parts 55 at the level of the coils 51.

The configuration of FIGS. 5a and 5b may also be seen as the (coils and/or permanent magnet) modules 20, 31 having protrusions (or male parts) and the first separator 30 having depressions (or female parts) mating with said protrusions (or male parts) of the modules 20, 31.

With such a type of structure based on male and female parts, the coupling of the permanent magnet modules 20, first separator 30 and winding modules 31 can be performed in a guided manner, such that the modules 20, 31 are correctly positioned with respect to each other.

Any of the first non-magnetic separators 30 shown in previous figures with the function of separating permanent magnet modules 20 and winding modules 31 may be of the type shown in FIGS. 5a and 5b, i.e. providing a guided interface.

Figure 6A:
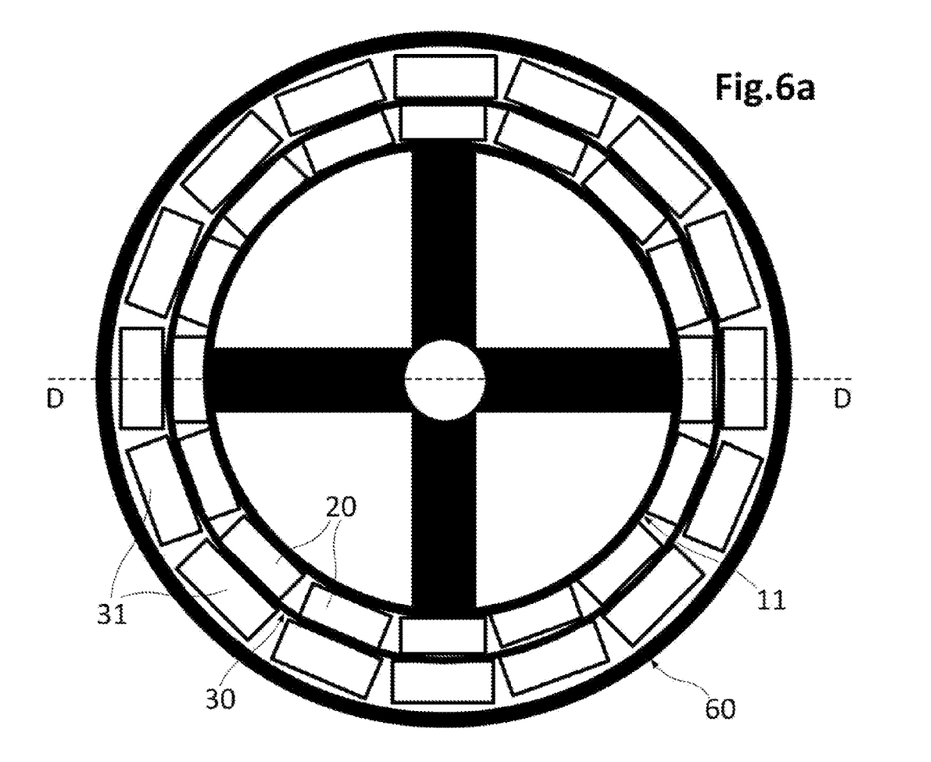
FIG. 6a illustrates a schematic, top view of the rotor structure shown in FIG. 5a, particularly illustrating the rotor structure installed within a stator structure.
Figure 6B:
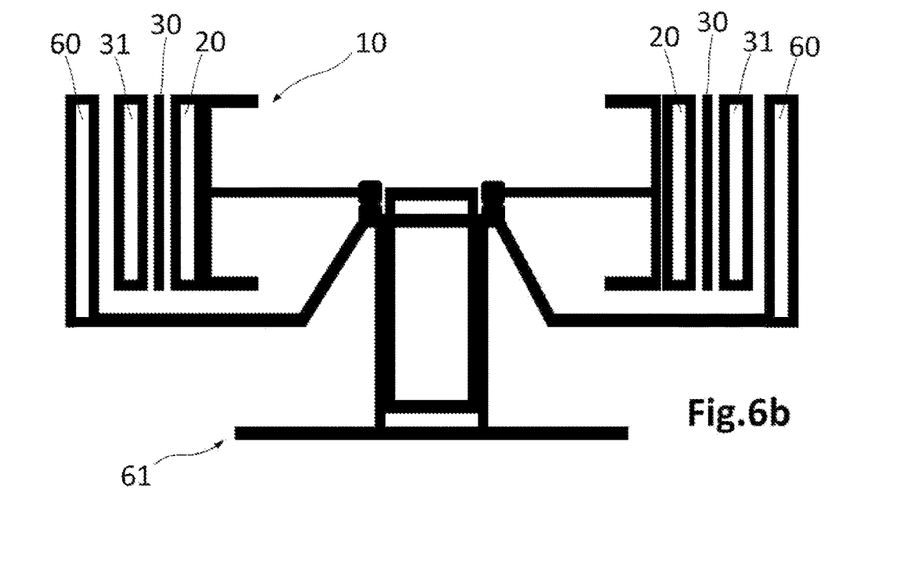
FIG. 6b illustrates a schematic, cross-sectional view of the rotor structure shown in FIG. 6a taken about plane D-D.

Once the attachment of the winding elements 31 has been completed, the rotor structure 10 with magnet elements 20, separators 30 and winding elements 31 can be assembled with a stator structure, as shown in FIGS. 6a and 6b. FIG. 6a schematically illustrates a top view of an arrangement resulting from this assembling, and FIG. 6b is a schematic illustration of a cross sectional view of the arrangement of FIG. 6a according to a reference plane DD.

This assembling of the whole rotor structure 10, 20, 30, 31 with the stator structure 60 may be performed by mounting the stator structure 10 on a supporting structure (e.g. a pedestal) 61, and carrying/moving the overall rotor structure 10, 20, 30, 31 for its assembling with (or insertion into) the stator structure 60 by using e.g. suitable crane(s), guiding element(s), etc.

In any case, such an insertion of the whole rotor structure 10, 20, 30, 31 into the stator structure 60 may result relatively simplified by the fact that the possibly strong magnetic fields created by the permanent magnets 20 may be substantially neutralized by the winding elements 31. Once the insertion has been completed, a certain gap between the winding elements and the stator structure will exist, but said gap will disappear as a result of attaching the winding elements to the corresponding rim of the stator.

Figure 7A:
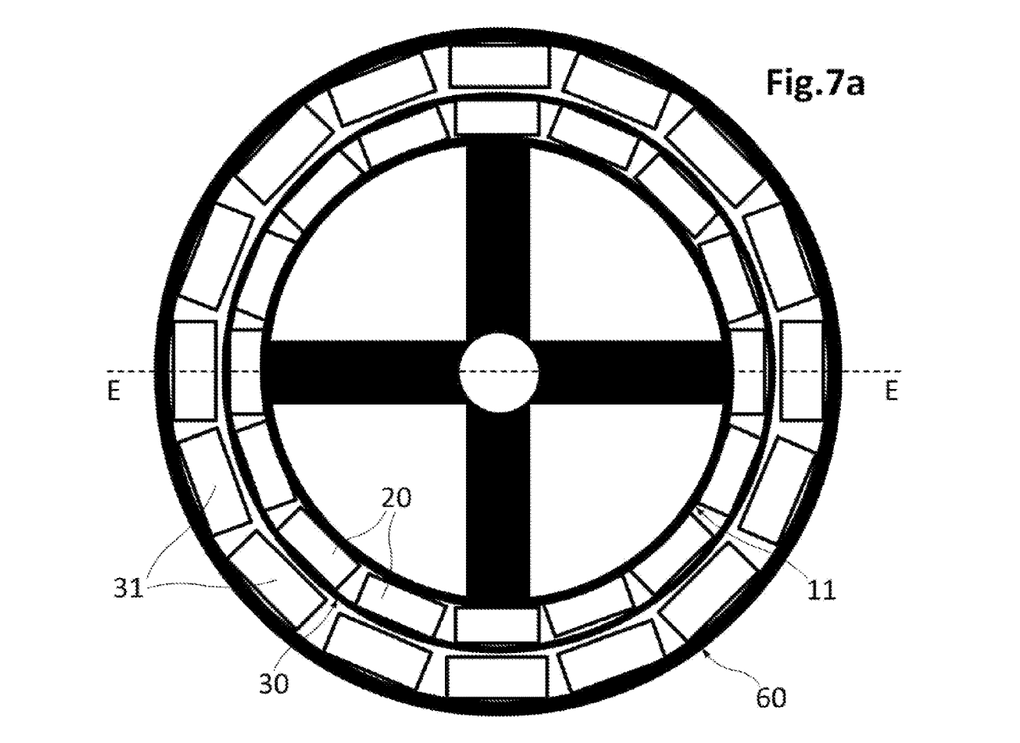
FIG. 7a illustrates a schematic, top view of the rotor structure shown in FIG. 6a, particularly illustrating the winding elements attached or fastened to the stator structure.
Figure 7B:
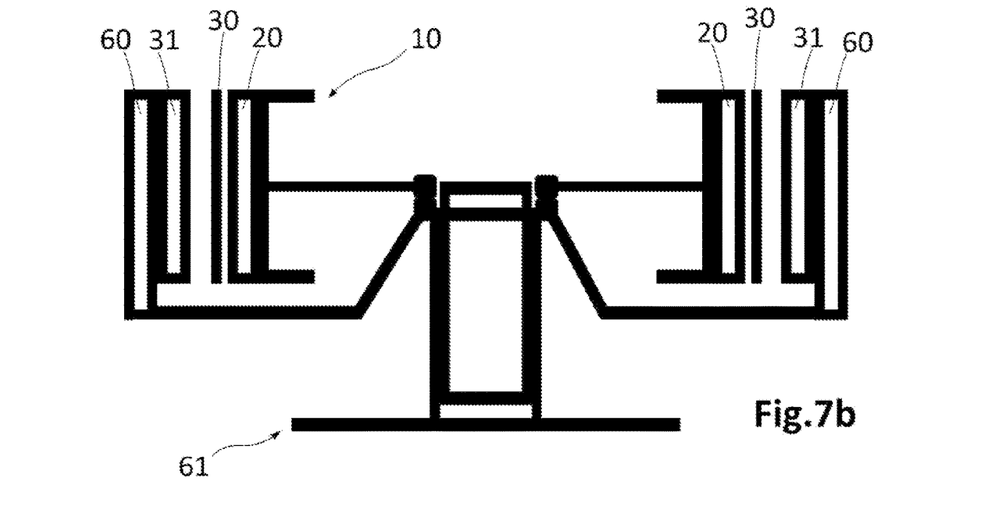
FIG. 7b illustrates a schematic, cross-sectional view of the rotor structure shown in FIG. 7a taken about plane E-E.

After having assembled the overall rotor structure 10, 20, 30, 31 with the stator structure 60, the winding elements 31 can be fastened to the stator structure 60, such that an arrangement as the one shown in FIGS. 7a and 7b can result. FIG. 7a schematically illustrates a top view of this resulting arrangement, and FIG. 7b depicts a schematic cross sectional view of said arrangement of FIG. 7a according to a reference plane EE.

FIGS. 7a and 7b show the winding elements 31 attached or fastened to the stator structure 60 in such a way that release of the non-magnetic separator 30 is caused. The fastening of the winding elements 31 to the stator structure 60 may be implemented by using e.g. screws or similar.

As commented above, a winding element 31 may be a single tooth and coil (or winding) which is fastened directly to the stator structure 60. However, alternatively, a winding element 31 may be a coils module having several teeth and a plurality of coils attached to the teeth, such that said coils are attached together to the stator structure 60 through the teeth. Alternatively, stator bars forming a part of a so-called distributed winding might be used instead of coils.

In some examples, the winding elements 31 as well as the rim of the stator structure 60 may comprise corresponding orifices or any other mechanism allowing the correct positioning of the winding elements 31. The orifices allow the fastening of the winding elements 31 to the stator structure 60 by using bolts, screws or any other feasible mechanism.

Figure 8A:
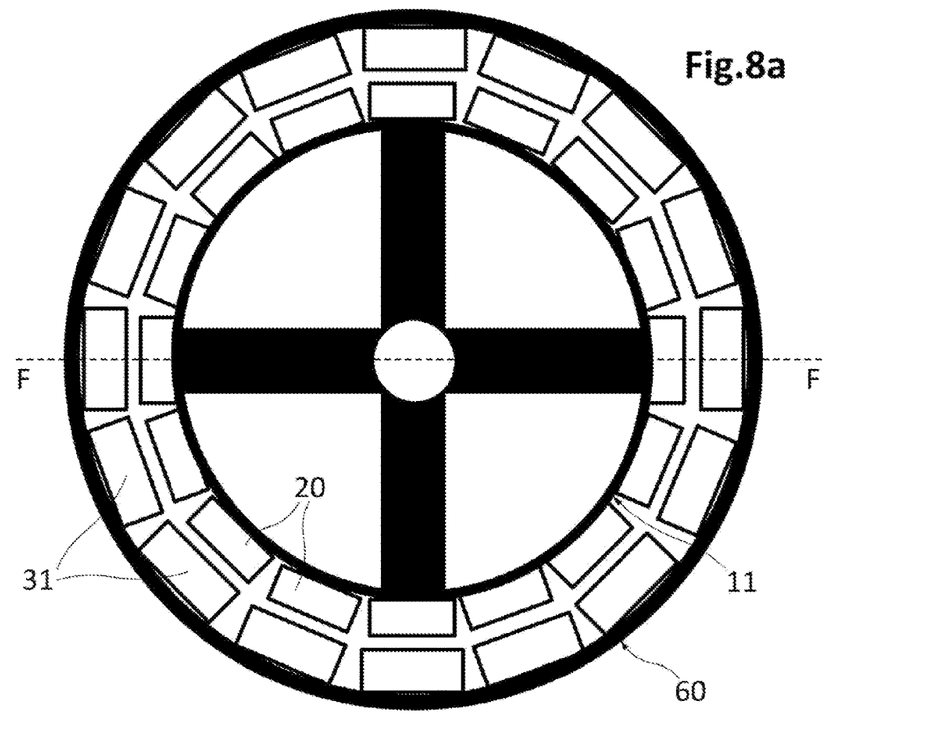
FIG. 8a illustrates a schematic, top view of the rotor structure shown in FIG. 7a, particularly illustrating the separator removed from the rotor structure to form an air gap in between the permanent magnet elements and the winding elements.
Figure 8B:
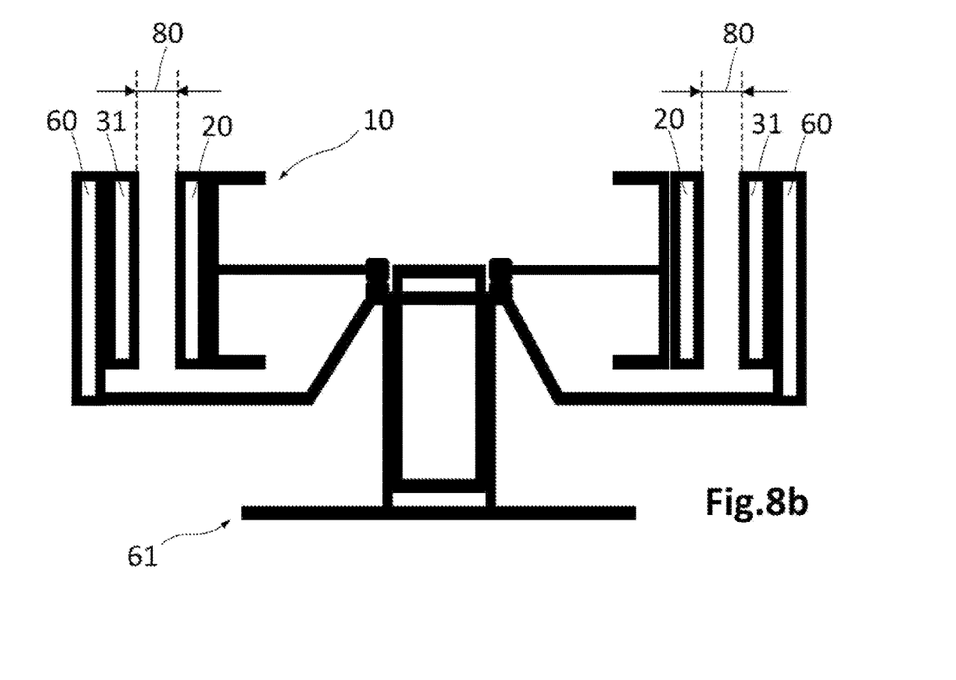
FIG. 8b illustrates a schematic, cross-sectional view of the rotor structure shown in FIG. 8a taken about plane F-F.

Once the separator 30 has been released, it may be extracted from the overall rotor structure 10, 20, 30, 31 in such a way that an arrangement as the one shown in FIGS. 8a and 8b may result. FIG. 8a is a schematic top view of this resulting arrangement, and FIG. 8b schematically shows a cross sectional view of the arrangement of FIG. 8a according to a plane of reference FF.

Both FIGS. 8a and 8b illustrate that an air gap 80 can result between the permanent magnet elements 20 and the winding elements 31. A desired width for the air gap 80 may be obtained with the above methods by using different components suitably sized, such as e.g. the rotor structure 10, the permanent magnets 20 and winding elements 31, the stator structure 60, etc.

Once the electrical machine (e.g. a generator) has been assembled, the overall structure of the assembled generator may be dismounted from the supporting structure 61 for e.g. its installation in a wind turbine or other types of apparatus requiring such a machine.

An aspect of the methods of constructing an electrical machine described with respect to FIGS. 1a-8b may be that advantage is taken of a phenomenon which normally represents a problem in prior art methods. For example, the magnetic field created by permanent magnet elements 20 may cause, in prior art methods, difficulties in the assembly of the rotor and stator. In the proposed methods, however, advantage is taken of the magnetic field for implementing the attachment of winding elements 31 and first non-magnetic separators 30 to the permanent magnets 20.

In the preceding examples, it has been considered that the permanent magnets are to be comprised in the rotor structure. However, a similar methodology may be applicable for the case where the permanent magnets are to be comprised in the stator structure. In such a case, the operations performed on the rotor structure as defined above will actually need to be performed on the stator structure, and vice-versa.

In the preceding examples, it has been considered that the permanent magnets are attached first to the rotor structure (or to the stator structure as briefly indicated above) and the windings are later attached to the magnets with corresponding separator(s) in between. However, a similar methodology may be applicable in which the windings are attached first to the rotor (or stator) structure and the magnets are later attached to the windings with corresponding separator(s) in between. In this case, the magnets need to be finally attached to the other structure (rotor or stator structure) in order to cause the release of the separator(s).

In the preceding examples, the stator is described surrounding the rotor and a generator is cited as the output of the assembling methods. Nevertheless, in alternative examples, the rotor can surround the stator and/or the output of the assembling methods may be an electrical motor instead of a generator.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method of constructing an electrical machine by assembling a first structure and a second structure along with a plurality of first elements and a plurality of second elements, wherein the first structure is a rotor structure or a stator structure;
the second structure is the other of the rotor structure or the stator structure;
the plurality of first elements are a plurality of permanent magnet elements or a plurality of winding elements; and
the plurality of second elements are the other of the plurality of permanent magnet elements or the plurality of winding elements; and wherein
the method comprises:
attaching the first elements to a rim of the first structure;
attaching radially inward sides of the second elements to the first elements, the attachment being caused by a magnetic attraction between the first and second elements;
assembling the first structure with the second structure such that radially outward sides of the second elements are positioned for attachment to a rim of the second structure; and
attaching the second elements to the rim of the second structure, such that the second elements are moved away from the first elements.

2. A method according to claim 1, wherein attaching the second elements to the rim of the second structure comprises attaching the second elements with one or more first non-magnetic separators sandwiched between the first elements and the second elements.

3. A method according to claim 2, further comprising removing the one or more first non-magnetic separators which have been previously released as a result of the attachment of the second elements to the rim of the second structure.

4. A method according to claim 3, wherein attaching the second elements to the rim of the second structure comprises attaching at least one pair of the second elements corresponding to the first elements with a second non-magnetic separator sandwiched between the pair of second elements.

5. A method according to claim 2, wherein a shape of a rotor side surface of the first non-magnetic separators is adapted to mate with a shape of a perimeter of the rotor.

6. A method according to claim 5, wherein attaching the second elements to the rim of the second structure comprises attaching at least one pair of the second elements corresponding to the first elements with a second non-magnetic separator sandwiched between the pair of second elements.

7. A method according to claim 2, wherein a shape of a stator side surface of the first non-magnetic separators is adapted to mate with a shape of a perimeter of the stator.

8. A method according to claim 7, wherein attaching the second elements to the rim of the second structure comprises attaching at least one pair of the second elements corresponding to the first elements with a second non-magnetic separator sandwiched between the pair of second elements.

9. A method according to claim 2, wherein the one or more first non-magnetic separators have a thickness between approximately 2 mm and approximately 4 mm smaller than a nominal air-gap value.

10. A method according to claim 2, wherein attaching the second elements to the rim of the second structure comprises attaching at least one pair of the second elements corresponding to the first elements with a second non-magnetic separator sandwiched between the pair of second elements.

11. A method according to claim 10, wherein the second non-magnetic separator has a thickness in a range of approximately 0.3 mm to approximately 0.7 mm.

12. A method according to claim 10, wherein the second non-magnetic separator and a corresponding one of the first non-magnetic separators are formed as a single piece.

13. A method according to claim 10, wherein the attachment of one or more of the second elements to corresponding one or more of the first elements is performed before the attachment of the one or more first elements to the rim of the first structure.

14. A method according to claim 1, wherein the attachment of one or more of the second elements to corresponding one or more of the first elements is performed before the attachment of the one or more first elements to the rim of the first structure.

15. A method according to claim 1, wherein attaching the second elements to the rim of the second structure comprises screwing the second elements to the second structure.

16. A method according to claim 1, wherein at least one of the permanent magnet elements is a single permanent magnet attached directly to the rim of the corresponding first or second structure.

17. A method according to claim 1, wherein at least one of the permanent magnet elements is a permanent magnet module that comprises a module base and a plurality of permanent magnets coupled to the module base, such that the permanent magnets are attached together to the rim of the corresponding first or second structure through the module base.

18. A method according to claim 1, wherein at least one of the winding elements is a single tooth and coil attached directly to the rim of the corresponding first or second structure.

19. A method according to claim 1, wherein at least one of the winding elements is a coil module that comprises one or more teeth and a plurality of coils coupled to the teeth, such that the coils are attached together to the rim of the corresponding first or second structure through the teeth.

20. A method according to claim 1, wherein at least one of the winding elements includes bars forming part of a distributed winding.

* * * * *